Patented Dec. 8, 1925.

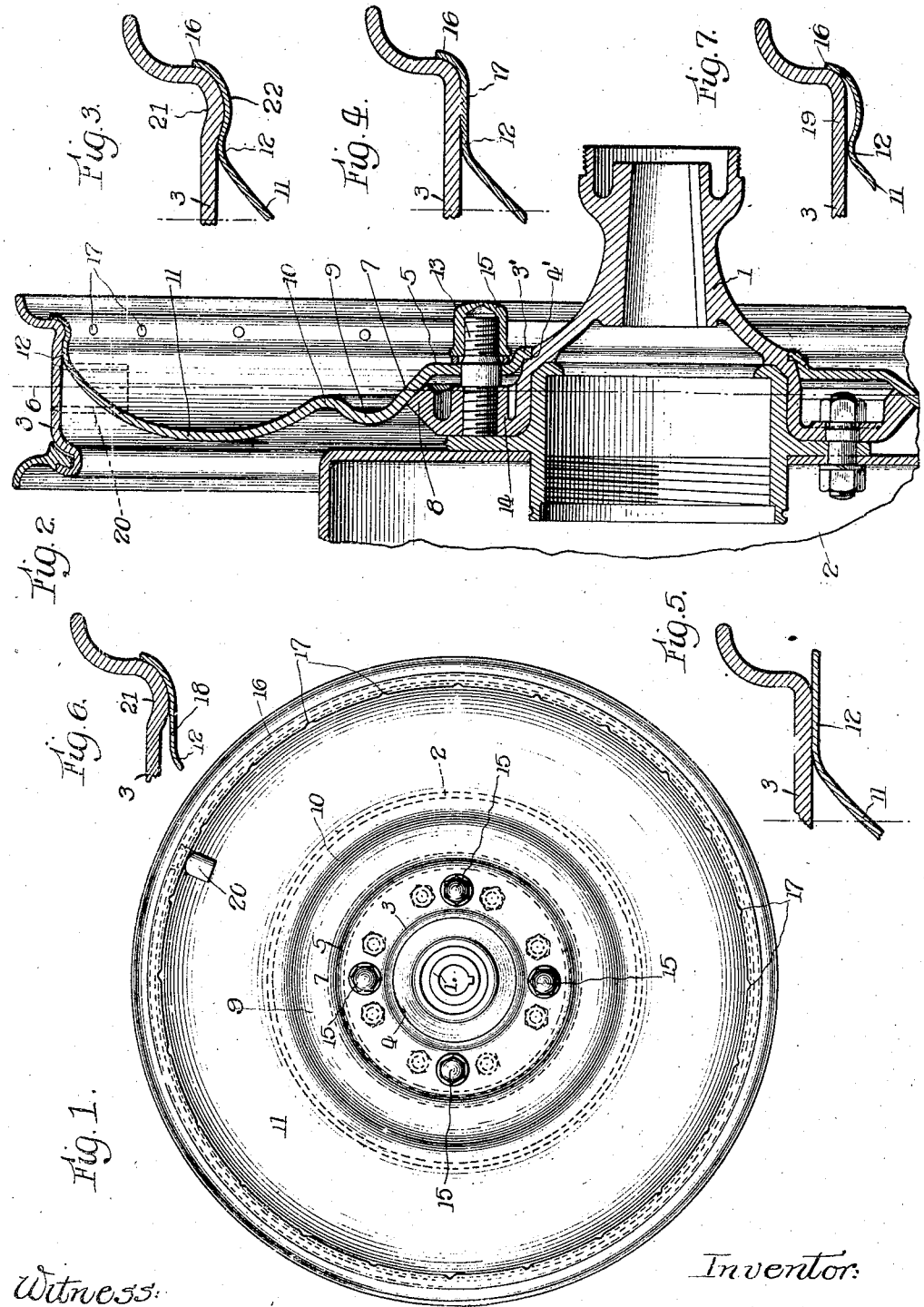

1,564,738

UNITED STATES PATENT OFFICE.

WILLIAM ERASTUS WILLIAMS, OF WILMETTE, ILLINOIS, ASSIGNOR TO AMERICAN STEEL FOUNDRIES, OF CHICAGO, ILLINOIS, A CORPORATION OF NEW JERSEY.

DISK WHEEL FOR AUTOMOBILES.

Application filed April 17, 1922. Serial No. 553,666.

*To all whom it may concern:*

Be it known that I, WILLIAM ERASTUS WILLIAMS, a citizen of the United States, a resident of Wilmette, in the county of Cook and State of Illinois, have invented a new and useful Improvement in Disk Wheels for Automobiles, of which the following is a specification.

The object of this invention is to provide an inexpensive, strong, somewhat elastic, readily washed, disk wheel.

In the accompanying drawings,

Fig. 1 shows in elevation, the outer broad side of a wheel having elongated, welded, indented, portions to secure the rim to the disk.

Fig. 2 is a diametrical section of the greater part of a wheel having circular welding indentations.

Fig. 3 is an enlarged radial section, between indentations, of the rim and adjacent portion of the disk.

Fig. 4 is a similar radial section through the welding indentations of Fig. 1.

Fig. 5 is a similar section illustrating a step in construction.

Figs. 6 and 7 are similar radial rim sections showing, respectively, slight modifications.

In these views, 1 indicates a common rear wheel hub, 2 a brake drum, 3 a rim of quick detachable type, and 4 a disk, of outwardly tapered radial section, having about its central opening an annular portion 3' projecting toward the outer end of the hub and marginally fitting a seat 4' upon the latter. The portion 3' is continuous with a plane zone 5 parallel to the general plane of the wheel and integrally joined to an inclined zone 7 which rests laterally against the similarly inclined surface of a hub flange 8, 14. The zone 7 merges outwardly, into an annular concave zone 9, continuous with a convex zone 10, which is integral with a broad concave zone 11 terminating in a lateral flange 12 extending toward the outer face of the wheel and seated against the inner, or central, side of the rim.

Stud bolts 13 fixed in the hub flange 8, 14, project through holes in the plane disk zone 5, which is not directly supported laterally, and bear nuts 15 which releasably secure the disk in contact with its hub seats.

Primarily the disk flange 12 and contiguous part of the rim are cylindrical and parallel to the wheel's axis, as suggested by the section shown in Fig. 5, but are shaped, together, by rollers or dies to form an inwardly extending annular bead 21 on the rim and a similar, interlocked, bead 22 on the disk flange 12. At the same time, the marginal portion 16 of the flange 12 is bent to fit the adjacent surface of the tire rim. After the disk and rim are thus permanently interlocked, the beads are indented and pressed outward at intervals, by welding electrodes (not shown), the indentation areas 17 being circular as shown in Fig. 2, or elongated, each extending across the beads, the groove of the flange bead being a groove which appears as a notch in Fig. 1. These indentations obviously form projections extending from the disk bead into like indentations in the rim bead, and they are of such depth that the metal at the bottom of the rim groove is again brought into its original position with respect to the cylindrical rim body, so that a radial section at the middle of the groove has the appearance seen in Fig. 4. The electrode-formed indentations would obviously mechanically prevent relative rotation or other relative movement of the rim and disk, even were the parts not integrally united by welding.

The annular disk-swell 9 and reversed swell 10 stiffen the disk in the zone of greatest skid strains, and also allow greater deflection of the zone 11, and consequently greater offsetting of the inclined zone 7, facilitating ease and accuracy in manufacture and securing greater certainty of perfect contact with the hub flange 8, 14.

Obviously, the interlocking beads may be formed simultaneously or may be formed in advance, as in Figs. 6 or 7, and the other be then bent into the same engagement as that before set forth, the part 18 of Fig. 6, for example, being pressed against the rim, giving the identical form shown in Fig. 3.

The disk zone 11 passes inside the central plane 6 of the wheel, allowing the use of a straight air valve stem; and I perforate the disk and secure in the perforation a short tube 20, whereby the disk wheel is perfectly adapted for inflating the tire from the outer face of the wheel and through a straight air valve stem.

What I claim is:—

1. The combination with a wheel disk laterally flanged peripherally to form a rim seat, of a tire carrying rim initially closely fitting said seat, the rim and disk flange being deformed together to interlock the two.

2. The combination with a rim, for carrying a pneumatic tire, having in the plane of one side of the tire seat an annular depression, and a wheel disk peripherally fixed to the rim at said depression, said rim and disk having mechanically engaging devices preventing any relative movement of the two.

3. The combination with a wheel disk having a lateral peripheral flange pressed inward to form an outer annular groove, of a wheel rim overlapping said flange and having an internal bead fitting in said groove, said bead and groove having at intervals mutually engaging indentations united by welding.

4. The combination with a tire-carrying rim having a circumferential depression approximately in the seat for one tire bead, of a wheel disk laterally flanged to receive the depressed portion of the rim and provided with a series of indentations locking it against rotation with respect to the rim.

5. In a device of the class described, a disk forming the web of the wheel, provided with a marginal flange, a rim adapted to seat on the said marginal flange and the parts of the said rim and said marginal flange swaged after they are assembled into mutual and inseparable engagement barring all relative movement.

6. A wheel disk having a lateral inwardly recessed peripheral flange, of a rim seated on said flange and having a projection extending into said recess, said flange and rim projection being fastened together at intervals and provided with interfitting indentations at the fastening points.

Signed at Chicago, in the county of Cook and State of Illinois, this 7th day of April, 1922.

WILLIAM ERASTUS WILLIAMS.